US012694232B2

(12) United States Patent
Weller et al.

(10) Patent No.: US 12,694,232 B2
(45) Date of Patent: Jul. 28, 2026

(54) METADATA PROCESSING

(71) Applicant: Astrata, Inc., Pittsburgh, PA (US)

(72) Inventors: Melissa Weller, Pittsburgh, PA (US);
Paige Haring, Pittsburgh, PA (US);
Eugene Tseytlin, Pittsburgh, PA (US);
Christopher Garcia Cordova,
Pittsburgh, PA (US)

(73) Assignee: Astrata, Inc., Pittsburgh, PA (US)

( * ) Notice: Subject to any disclaimer, the term of this
patent is extended or adjusted under 35
U.S.C. 154(b) by 235 days.

(21) Appl. No.: 18/545,252

(22) Filed: Dec. 19, 2023

(65) Prior Publication Data

US 2024/0220736 A1 Jul. 4, 2024

Related U.S. Application Data

(60) Provisional application No. 63/436,074, filed on Dec.
29, 2022.

(51) Int. Cl.
*G06F 40/40* (2020.01)
*G06F 16/383* (2019.01)
*G06F 40/289* (2020.01)

(52) U.S. Cl.
CPC ............ *G06F 40/40* (2020.01); *G06F 16/383*
(2019.01); *G06F 40/289* (2020.01)

(58) Field of Classification Search
CPC ........ G06F 40/40; G06F 40/289; G06F 40/30;
G06F 16/383
See application file for complete search history.

(56) References Cited

U.S. PATENT DOCUMENTS

| | | | | |
|---|---|---|---|---|
| 7,761,471 B1 * | 7/2010 | Lee | ...................... | G06F 16/245 |
| | | | | 707/783 |
| 7,945,600 B1 * | 5/2011 | Thomas | ................ | G06F 16/353 |
| | | | | 707/804 |
| 10,318,543 B1 * | 6/2019 | Sharifi | .............. | G06F 16/24573 |
| 11,036,764 B1 * | 6/2021 | Zelenov | ................ | G06F 16/906 |

(Continued)

OTHER PUBLICATIONS

American Medical Association, "Quality ID #343: Screening Colonoscopy Adenoma Detection Rate—National Quality Strategy Domain: Effective Clinical Care," Version 2.0, Dec. 11, 2017, 8 pages.

(Continued)

*Primary Examiner* — Anne L Thomas-Homescu
(74) *Attorney, Agent, or Firm* — Fish & Richardson P.C.

(57) ABSTRACT

Methods, systems, and apparatus, including computer programs encoded on computer storage media, for processing metadata. One of the methods includes accessing a document a) that has, in metadata that can be used to perform natural language processing, a first set of values for a first subset of metadata types from a plurality of metadata types and b) for which a second set of values for a second subset of metadata types from the plurality can be augmented; selecting, for a metadata type from the second subset of metadata types, one or more value extraction processes from a plurality of value extraction processes each of which is for a corresponding metadata type from the plurality; determining, using the one or more value extraction processes and the document, a value for the metadata type; and storing the value for the metadata type as part of the metadata for the document.

19 Claims, 3 Drawing Sheets

(56)     References Cited

U.S. PATENT DOCUMENTS

| | | | |
|---|---|---|---|
| 2013/0132365 A1* | 5/2013 | Chang ................ | G06F 16/3344 |
| | | | 707/794 |
| 2020/0301960 A1* | 9/2020 | Lombardo ........... | G06F 16/906 |
| 2022/0164397 A1* | 5/2022 | Escalona ................ | G06F 16/93 |

OTHER PUBLICATIONS

Blulab.chpc.utah.edu [online], "ConText/NegEx," available on or before Mar. 29, 2019 via Internet Archive Wayback Machine URL<https://web.archive.org/web/20190329085045/http://blulab.chpc.utah.edu/content/contextnegex>, retrieved on Feb. 5, 2024, retrieved from URL<https://web.archive.org/web/20190329085045/http://blulab.chpc.utah.edu/content/contextnegex>, 3 pages.
Clamp.uth.edu [online], "CLAMP: Clinical Language Annotation, Modeling, and Processing Toolkit," available on or before Apr. 23, 2021 via Internet Archive: Wayback Machine URL<https://web.archive.org/web/20210423230014/http://clamp.uth.edu/index.php>, retrieved on Feb. 5, 2024, retrieved from URL<https://clamp.uth.edu/index.php>, 9 pages.
Harkema et al., "ConText: An algorithm for determining negation, experiencer, and temporal status from clinical reports," Journal of Biomedical Informatics, Oct. 2009, 42(5):839-851.

* cited by examiner

200

Access a document a) that has, in metadata that can be used to perform natural language processing for the document, a first set of values for a first subset of metadata types from a plurality of metadata types for the metadata and b) for which a second set of values for a second subset of metadata types from the plurality of metadata types can be augmented
*202*

Is a value for a metadata type included in the metadata or does a predicted accuracy of the value satisfy a threshold accuracy?
*204*

No          Yes

Select, for the metadata type, one or more value extraction processes from a plurality of value extraction processes each of which is for a corresponding metadata type from the plurality of metadata types
*208*

Determine to normalize the value or skip selection a value extraction process for the metadata type
*206*

Determine, using the one or more value extraction processes and the document, a value for the metadata type    *210*

Store the value for the metadata type as part of the metadata for the document    *212*

Should natural language processing on the document be performed?
*214*

Yes          No

Perform natural language processing on the document using the metadata
*216*

Determine to skip performing natural language processing on the document
*218*

FIG. 2

METADATA PROCESSING

CROSS-REFERENCE TO RELATED APPLICATION

This application claims the benefit of U.S. Provisional Application No. 63/436,074, filed on Dec. 29, 2022, the contents of which are incorporated by reference herein.

BACKGROUND

Natural language processing ("NLP") systems can process documents to detect relationships between words in a single document. For instance, an NLP system can process a document to determine contextual nuances of the language included in the document when such nuances are not explicitly included in the document or the document's metadata.

SUMMARY

In general, one innovative aspect of the subject matter described in this specification can be embodied in methods that include the actions of accessing, from memory, a document a) that has, in metadata that can be used to perform natural language processing for the document, a first set of values for a first subset of metadata types from a plurality of metadata types for the metadata and b) for which a second set of values for a second subset of metadata types from the plurality of metadata types can be augmented; selecting, for a metadata type from the second subset of metadata types for which a value can be augmented, one or more value extraction processes from a plurality of value extraction processes each of which is for a corresponding metadata type from the plurality of metadata types; determining, using the one or more value extraction processes and the document, a value for the metadata type; and storing, in memory, the value for the metadata type as part of the metadata for the document.

Other implementations of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations, the method can include determining, for the metadata type from the plurality of metadata types and before selecting the one or more value extraction processes, that a value for the corresponding metadata type is not included in the metadata or a predicted accuracy of the value for the corresponding metadata type does not satisfy a threshold accuracy. Selecting the one or more value extraction processes can be responsive to determining that the value for the corresponding metadata type is not included in the metadata or the predicted accuracy of the value for the corresponding metadata type does not satisfy the threshold accuracy. The method can include determining, for another metadata type from the plurality of metadata types, that another predicted accuracy for another value for the other metadata type satisfies the threshold accuracy; and in response to determining that the other predicted accuracy for the other value for the other metadata type satisfies the threshold accuracy, determining to normalize the other value. This can improve the overall downstream natural language processing analysis.

In some implementations, the method can include providing, to a natural language processing system, the second subset of metadata to cause the natural language processing system to perform natural language processing on the document using the second subset of metadata. This can cause more accurate natural language processing using the second subset of metadata.

In some implementations, providing the second subset of metadata to the natural language processing system can causes the natural language processing system to determine, using the second subset of metadata, whether to perform natural language processing on the document. This can reduce computational resource usage, e.g., when the natural language processing system determines to skip performing natural language processing, such as when the second subset of metadata indicates that the natural language process would be inaccurate, or otherwise have poor results.

In some implementations, the method can include providing, to a natural language processing system, the second set of metadata to cause the natural language processing system to determine, using the second subset of metadata, to skip performing natural language processing on the document. This can reduce computational resource usage, e.g., when the natural language processing system determines to skip performing natural language processing, such as when the second subset of metadata indicates that the natural language process would be inaccurate, or otherwise have poor results.

In some implementations, the method can include, for each of two or more documents each of which is for a different entity and has a different document type and using a single ontology: normalizing one or more phrases in the corresponding document. Determining, using the one or more value extraction processes and the document, the value for the metadata type can use the normalized one or more phrases from the corresponding document. This determination of the value using the normalized phrases can be enabled because of use of the single ontology for the different document types for the different entities. The use of normalized values can simplify, e.g., save computation resources for, downstream processing.

In some implementations, selecting the one or more value extraction processes can include selecting, for the metadata type from the second subset of metadata types for which a value can be augmented, an artificial intelligence model from a plurality of artificial intelligence models each of which was trained to detect values for a corresponding metadata type from the plurality of metadata types. Determining, using the one or more value extraction processes, the value for the metadata type can use the selected artificial intelligence model for the metadata type. Determining, using the selected artificial intelligence model for the metadata type, the value for the metadata type can include providing structured data for the document to the selected artificial intelligence model as input.

In some implementations, determining, using the one or more value extraction processes, the value for the metadata type can include: detecting, for the first metadata type, two or more key phrases in the document; determining, for each of the two or more key phrases, a frequency of the respective key phrase in the document; and selecting, as the value for the metadata type, a most frequent key phrase from the two or more key phrases and that has a highest frequency in the document of the two or more key phrase. Detecting the two or more key phrases in the document can include: determining, for the metadata type, one or more regions in the document to analyze for key phrases; and detecting, in the one or more regions in the document, the two or more key phrases. The one or more regions in the document to analyze for the key phrase for the metadata type can be different than one or more second regions in the document to detect a second key phrase for another metadata type from the second subset of for which a value can be augmented.

In some implementations, determining the value for the metadata type from the second subset of metadata types for which a value can be augmented can use, as the one or more value extraction processes, the key phrase and one or more rules for the metadata type. The one or more rules for the metadata type can be different than one or more second rules for determining another metadata value for another metadata type from the second subset of metadata types for which a value can be augmented.

In some implementations, determining, using the one or more value extraction processes, the value for the metadata type can include: determining, using the one or more value extraction processes, that a confidence score for a detected value that indicates a likelihood that the detected value is for the metadata type does not satisfy a confidence threshold; and selecting, using the metadata type and an ontology, a default value for the metadata type in response to determining that the confidence score for the detected value that indicates the likelihood that the detected value is for the metadata type does not satisfy the confidence threshold.

In some implementations, determining, using the one or more value extraction processes, the value for the metadata type can include: determining, for one or more fields in the document, whether the one or more fields have data; and determining, using a result of the determination whether the one or more fields have data, the value for the metadata type. The method can include determining, from a plurality of fields in the document each of which are for at least one metadata type from the plurality of metadata types, the one or more fields in the document using the metadata type.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform those operations or actions. That one or more computer programs is configured to perform particular operations or actions means that the one or more programs include instructions that, when executed by data processing apparatus, cause the apparatus to perform those operations or actions. That special-purpose logic circuitry is configured to perform particular operations or actions means that the circuitry has electronic logic that performs those operations or actions.

The subject matter described in this specification can be implemented in various implementations and may result in one or more of the following advantages. In some implementations, the systems and methods descried in this specification and improve an accuracy of a natural language processing system, e.g., using newly determined metadata, create metadata for a document which metadata did not already exist, or both. In some implementations, the systems and methods described in this specification can simplify downstream processing of data for a document when at least some of that data was normalized, e.g., using a normalization process. In some implementations, the systems and methods described in this specification that use an ontology, a process engine, or both, for multiple different entities can have improved performance compared to other systems, e.g., that have to switch ontologies, process engines, or both, for every different entity. For instance, by using a common ontology, process engine, or both, across different entities, document types, or both, a system can reduce computer memory usage by storing data for fewer ontologies, process engines, or both. In some examples, the systems and methods described in this specification can have computation that is more efficient, more accurate, or both, compared to other systems by reusing ontologies, process engines, or both, compared to other systems, e.g., when documents for different entities use different formatting, different language, or both. In some implementations, a natural language process can be faster by using metadata, e.g., augmented metadata, compared to other systems.

In some implementations the use of a common ontology across different entities, document types or both, can enable a processing system to be a white box processing system. For instance, by normalizing phrases in documents for different entities, with different types, or both, using a single ontology, can enable output of the system to be interpretable, explainable, or both, as to why the system, e.g., algorithms that implement the system, outputted what it did. In some implementations, the use of a single common ontology can enable a system to have updated, e.g., new or removed, logic by updating the ontology which features might not be implementable in other systems that do not have a single common ontology, e.g., black-box systems. In some implementations, the ontology itself is can be portable across multiple different systems, e.g., the ontology can be useful to any system that can extract the knowledge and logic it holds.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a flow diagram of an example process for processing metadata.

Like reference numbers and designations in the various drawings indicate like elements.

DETAILED DESCRIPTION

A system can use metadata to perform natural language processing ("NLP") of a document. When the system uses multiple different types of metadata, whether the system has values for each metadata type, or a threshold number of metadata types, can affect the NLP process. For instance, if a system does not have values for the threshold number of metadata types from multiple types, the system might not perform accurate NLP of the document, e.g., the NLP process accuracy would not satisfy an accuracy threshold.

To improve the NLP process, the system can receive a document that has initial metadata. The initial metadata can be generated as part of the document creation process, e.g., creation date and author, added after, or a combination of both. For metadata types for the document for which the system does not have corresponding values, the system can determine values, confidence score for those values, or both. A confidence score can indicate a likelihood that the value is for the metadata type. When the confidence score does not satisfy a confidence threshold, the system can determine to skip storing the value for the metadata type, can select a default value using an ontology or another type of rule-based logic, or a combination of both. When the confidence score satisfies the confidence threshold, the system can store the value, in memory, for the metadata type as part of the metadata for the document. This can improve downstream processing, such as NLP of the document or other processes that use the document.

When the system processes documents for multiple other systems, the amount, reliability, or both, of metadata from the other systems can vary. For instance, for a particular document type, the system can receive values for a first metadata type from one system and values for a second metadata type from another system. As a result, when one or both of these metadata types can improve an accuracy of NLP processing, the system might perform less optimally than it otherwise would if it had both types of metadata for documents from both systems.

Figure 1:
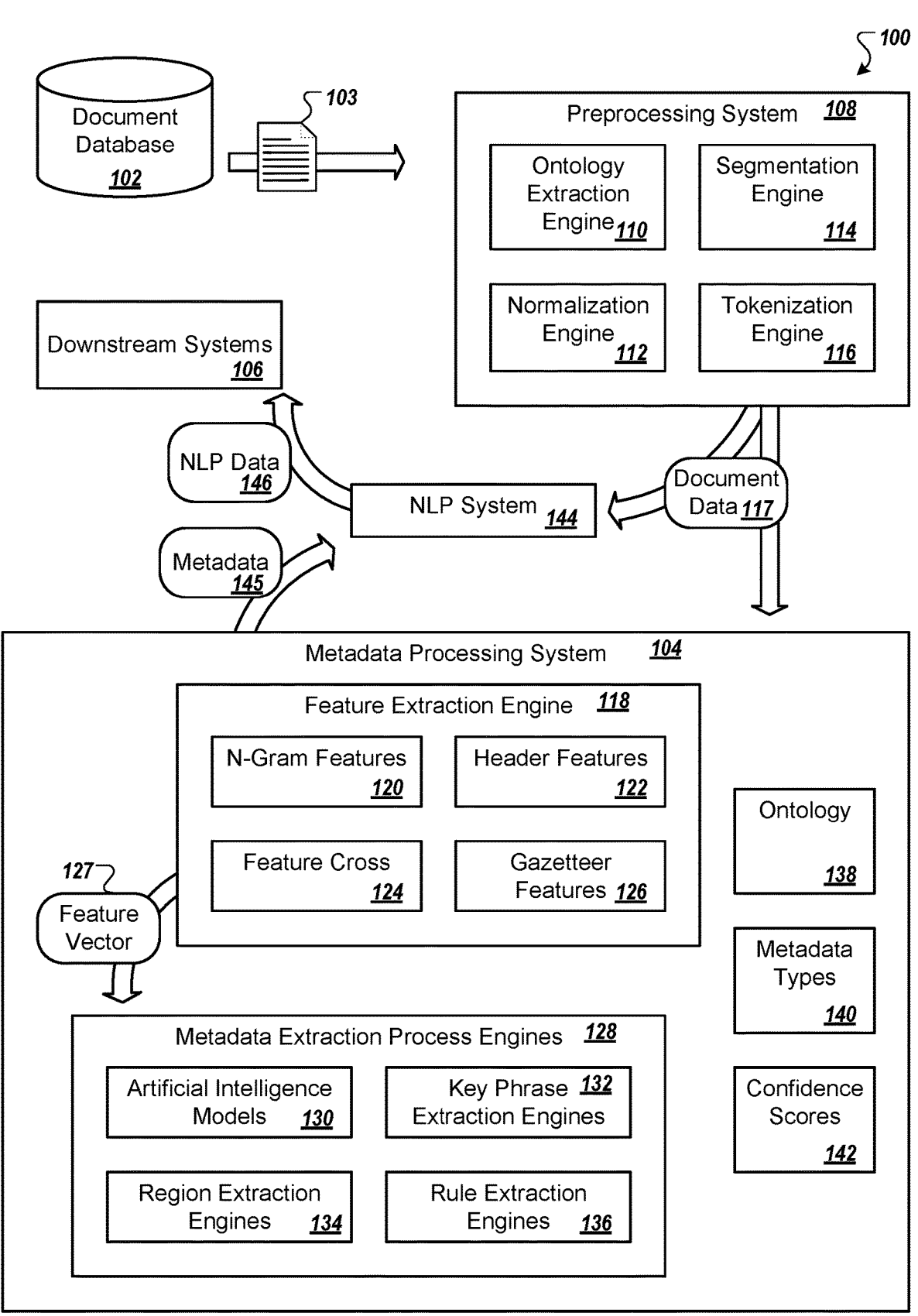
FIG. 1 depicts an example environment that determines values for a document's metadata types.

FIG. 1 depicts an example environment 100 that determines values for a document's metadata types. The environment 100 includes a document database 102 that provides data for a document 103 to a metadata processing system 104, a natural language processing system 144, or both. The metadata processing system 104, or the natural language processing system 144 can determine whether the document 103 is missing metadata, or that a predicted accuracy of a value for a metadata type does not satisfy an accuracy threshold. If neither are true for the document 103, e.g., and the predicted accuracy of the value satisfies the accuracy threshold for all metadata values, the natural language processing system 144 can perform language processing on the document 103 natural language processing system 144.

If the document 103 is missing metadata, or a predicted accuracy value for a metadata type does not satisfy the accuracy threshold, the natural language processing system 144 would normally be unable to perform natural language processing on the document 103, or accurate natural language processing. As a result, under these circumstances, the metadata processing system 104 can perform one or more processes on data for the document 103 to infer metadata values for the document 103. The inferred metadata values can be normalized values or any other appropriate value for the corresponding metadata type. A normalized value can be a value from a defined set of metadata values for a corresponding metadata type, e.g., as defined in an ontology. By inferring the metadata values, the metadata processing system 104 can enable the natural language processing system 144 to perform natural language processing for the document 103 that would otherwise be inaccurate or unavailable.

In this specification, a value can have a predicted accuracy that indicates a likelihood that the metadata is accurate, e.g., is reliable. For instance, the document 103 can have a value of "notes" for a document type. The corresponding predicted accuracy can indicate a likelihood that the document 103 is of a notes document type as compared to another document type, such as a questionnaire, an intake form, or a report.

Since the natural language processing system 144 can use the metadata to improve the natural language processing system's 144 output, accurate metadata can improve the accuracy of the output, e.g., NLP data 146.

The environment 100 includes a preprocessing system 108. The preprocessing system 108 can process data for the document 103 for further processing. For instance, the preprocessing system 108 can generate document data 117. The document data 117 can be any appropriate type of data for the document 103, such as one or more tokens for the document 103.

In some examples, the preprocessing system 108, or the natural language processing system 144, can determine whether the document 103 should be augmented with additional metadata. For example, the preprocessing system 108 can determine whether the document 103 has metadata. If the document 103 has metadata, e.g., retrieved from the document database 102 with or separately from the document 103, the preprocessing system 108 can determine whether values for some metadata types are missing, whether an accuracy or predicted accuracy of some values do not satisfy an accuracy threshold, or both. If both are false, e.g., and none of the values are missing and the predicted accuracies for the values satisfies the accuracy threshold, the preprocessing system 108 can determine that the natural language processing system 144, or a downstream system 106, can process the document 103 with the existing metadata. In these situations, the preprocessing system 108 or the natural language processing system 144, depending on which system is performing the analysis, can determine to skip augmentation of metadata for the document 103.

If the preprocessing system 108 determines that values for some metadata types are missing, the predicted accuracy does not satisfy the accuracy threshold, or both, the preprocessing system 108 can perform one or more processes on data for the document 103. For instance, the preprocessing system 108 can extract data from the document 103 as part of a tokenization process.

In examples in which the natural language processing system 144 performs the determination whether to augment metadata for the document 103, the natural language processing system 144 can receive the document 103 from the document database 102. The natural language processing system 144 can determine whether to augment metadata for the document 103. In response to determining to augment metadata for the document, the natural language processing system 144 can provide the document 103, or data for the document 103, to the preprocessing system 108.

The preprocessing system 108 can use an ontology extraction engine 110 to perform an ontology extraction process for the document 103. The ontology extraction process can include extracting an ontology for the document 103, e.g., from an ontology database. For instance, the ontology extraction process can include any appropriate processes by which the preprocessing system 108 determines an ontology for the document. The ontology database can be included in the document database 102, the natural language processing system 144, another system, e.g., as a separate database accessible by various systems included in the environment 100, or a combination of these.

The ontology can be specific to the document 103, specific to an entity that generated the document 103, e.g., a company for which the document was generated, can be a general ontology for the type of document, or a combination of these. For instance, a first document type, e.g., notes documents, can have a first ontology while a second, different document type, e.g., report document, can have a second, different ontology.

In some examples, at least portions of the ontology can apply to multiple different entities, multiple different document types, or both. For instance, the ontology database can include a base ontology. The ontology database can include one or more specialized ontologies. The specialized ontologies can be specific to a particular document type, geographic region, process, entity, or combination of these. The specialized ontologies can be used in conjunction with the base ontology.

By using the base ontology for multiple different entities, document types, geographic regions, or a combination of these, the systems in the environment 100, e.g., the metadata processing system 104, can reduce computational resource usage, e.g., memory usage. The components in the metadata processing system 104 can then more efficiently access the base ontology than they would otherwise if there were only the specialized ontologies.

The use of the specialized ontologies enables entities to prioritize particular metadata types for its documents, document regions to search for values for corresponding metadata types, or both. In this way, The ontology extraction engine 110 can detect one or more stop phrases, one or more regular expressions, one or more headers, or a combination of these. The ontology extraction engine 110 can use the detected data to generate an ontology 138, select an ontology from the ontology database, or a combination of these.

The preprocessing system 108 can use a normalization engine 112 to perform a normalization process on one or more phrases in the document 103. The normalization process can include masking or removing phrases from the document 103, e.g., that might bias a model during training, runtime, or both. In some examples, the normalization process can include masking infrequent phrases, e.g., with an unknown phrase token. The normalization process can include converting synonyms, acronyms, or both, to corresponding normalized phrases, e.g., using a mapping. In this way, the preprocessing system 108 can cause data that represents the document 103, and is used by the metadata processing system 104 to determine metadata, to have more standardized values. In this specification a phrase can include one or more words.

Use of the normalization engine 112 can improve downstream processing of data for the document 103. For instance, the normalization process can simplify downstream processing by the natural language processing system 144, processing of the NLP data 146 by the downstream systems 106, or a combination of both. This can include reducing processing time, reducing computational resource usage, or a combination of both.

In some examples, within a dataset in the document database 102, each document, e.g., text file, can have a corresponding metadata properties file. The metadata properties file can contain the entity defined metadata for the corresponding document 103. For each document in that dataset, the preprocessing system 108 can generate, e.g., using the ontology 138, a metadata file that contains the normalized values for each metadata type, e.g., each metadata type of interest. In some examples, for each document in that dataset, the preprocessing system 108 can analyze the document 103 and generates a metadata file that contains the normalized values for each metadata type, optionally leveraging information from the entity defined metadata.

The preprocessing system 108 can use a segmentation engine 114 to perform one or more segmentation processes. For instance, the preprocessing system 108 can perform section segmentation, sentence segmentation, or both. The one or more segmentation processes can be any appropriate processes for segmentation of a corresponding portion of the document 103.

The preprocessing system 108 can use a tokenization engine to perform a tokenization process. The tokenization engine 116 can receive, as input, data output by the one or more segmentation engine 114. The tokenization process can be of any appropriate portion of text from the document 103, e.g., a section, a sentence, a phrase, a word, an n-gram, or a combination of these.

The preprocessing system 108 can provide document data 117 for the document 103 to the natural language processing system 144, the metadata processing system 104, or a combination of both. For instance, the preprocessing system 108 can provide tokenized data for the document 103 to the natural language processing system 144. The natural language processing system 144 can provide the tokenized data to the metadata processing system 104.

A feature extraction engine 118, included in the metadata processing system 104, can determine one or more features for the document 103 using the document data 117. The feature extraction engine 118 can represent the features as any appropriate type of data structure, such as a feature vector 127. For instance, the feature extraction engine 118 can extract n-gram features 120, header features 122, e.g., section header features, one or more feature crosses 124, one or more gazetteer features 126, or a combination of these.

The one or more feature crosses 124 can be combinations of other features. A feature-cross can be a combination of two or more features that could otherwise be used independently of each other. For instance, the feature extraction engine 118 can generate a feature cross C that is a combination of feature A and feature B where feature cross C=Feature A & Feature B, e.g., a combination of a section header and an n-gram feature. The metadata processing system 104 can then use all of these features as input to one or more processes, e.g., using the vector [A, B, C] as input. For example, the feature extraction engine 118 can extract an n-gram and specify the section it occurs under: "trigram: the medical device"&"sectionHeader: Summary of Visit", which n-gram and section can be used by the metadata processing system 104 independently of each other. In some examples, the feature extraction engine 118 can extract n-grams and the lengths of sentences in a given document, and use those features independently of each other as input, cross them "bigram: patient is&inSentenceOfLength: 16", or a combination of both.

The one or more gazetteer features 126 can indicate a relationship of another feature with a corresponding type. For instance, a gazetteer feature can indicate that "phishing" is a "typeOfScam", that a "colonoscopy" is a "mentionOfprocedure" or that a "smart phone" is a "typeOfComputer."

The metadata processing system 104 can determine, for a metadata type from multiple metadata types 140, one or more process engines from multiple metadata extraction process engines 128 to use to determine a corresponding value. The metadata extraction process engines 128 can include any appropriate types of engines, such as one or more artificial intelligence models 130, one or more key phrase extraction engines 132, one or more region extraction engines 134, one or more rule extraction engines 136, or a combination of two or more of these.

The metadata processing system 104 can determine the one or more extraction process engines using the metadata type. For instance, the artificial intelligence models 130 can include a first model for a first metadata type, e.g., document type, and a second model for a second metadata type, e.g., subject matter domain. Some examples of subject matter domains can include phishing, ransomware, urology, rheumatology, physics and mathematics. As a result, the metadata processing system 104 can select a processing engine that is more likely to determine a value for the metadata type than another processing engine.

The artificial intelligence models 130 can be any appropriate type of models. For example, one artificial intelligence model 130 can be a shallow neural network, another artificial intelligence model 130 can be a deep neural network, another can be for a wide neural network, or a network can include features from a combination of these. The artificial intelligence models 130 can include multiple shallow neural networks, each for corresponding metadata types, and multiple deep neural networks, each for different corresponding metadata types.

The artificial intelligence models 130 can generate any appropriate type of output. For instance, a first model can infer a label y from a label set Y as the value for the corresponding metadata type. The first model can output a confidence score 142 that indicates a likelihood that the value is accurate.

The metadata extraction process engines 128 can include one or more key phrase extraction engines 132. The key phrase extraction engines 132 can search text for the document 103 for key phrases. When the key phrase extraction engine 132 detects a key phrase, the key phrase extraction engine 132 can create a frequency dictionary for the key phrase. The frequency dictionary can be for all metadata types, for a particular metadata type, e.g., to which the key phrase corresponds, or a combination of both. Once the dictionaries are created, the key phrase extraction engine 132 can select a most frequently detected key phrase, e.g., a normalized value for a key phrase, as a value for the corresponding metadata type. For instance, each metadata type can have one or more key phrases that indicate values for the metadata type. Some key phrases can correspond to more than one metadata type, e.g., date of submission and date of last edit to the document 103.

The key phrase extraction engines 132 can use one or more settings when detecting key phrases in the document 103. For instance, the settings can indicate an amount of the document 103 to search for a key phrase, whether key phrases can be used to infer values for other metadata types, e.g., using the ontology 138, or a combination of both.

The metadata extraction process engines 128 can include one or more region extraction engines 134. The region extraction engine 134 can analyze regions of the document 103 to detect data for the metadata values. For instance, the region extraction engine 134 can determine one or more regions of the document 103 that are most likely to have a value for a corresponding metadata type 140. The region extraction engine 134 can analyze data for the one or more regions, provide the data for the one or more regions to another metadata extraction process engine 128, or a combination of both. For instance, the region extraction engine 134 can determine that a second portion of the document 103 is most likely to have a value for a metadata type and provide data for the second portion to the artificial intelligence model 130, the key phrase extraction engine 132, or both. The region extraction engine 134 can determine the one or more regions using data in the ontology, e.g., that identifies the metadata type and corresponding document regions to search.

By using the region extraction engine 134, the metadata processing system 104 can determine to analyze one or more first regions in the document 103 for a first key phrase for a first metadata type that are different regions than one or more second regions in the document 103 for a second key phrase for a second metadata type, e.g., when both metadata types can be augmented.

The metadata extraction process engines 128 can include one or more rule extraction engines 136. The rule extraction engine 136 can use rules to determine whether the document 103 has a value for the metadata type.

The metadata processing system 104 can weight outputs for one or more of the metadata extraction process engines 128. For instance, the rule extraction engine 136 might be less accurate than the other types of metadata extraction process engines 128. As a result, if the metadata processing system 104 combines results from multiple engines, the metadata processing system 104 can weight values from the rule extraction engine 136 so that those values have less influence on a final value for the metadata type. The metadata processing system 104 can similarly weight outputs for any combination of engines from the metadata extraction process engines 128.

Similar to the artificial intelligence engine 130, the other metadata extraction process engines 128 can generate confidence scores. The confidence scores can indicate a likelihood that a determined value is accurate, applies to the corresponding metadata type, or both. For example, any appropriate combination of engines from the metadata extraction process engines 128 can each generate a corresponding confidence score. In some examples, the artificial intelligence engine 130 might not generate confidence scores while one or more of the other metadata extraction process engines 128 generate confidence scores.

The metadata processing system 104 can select a value for the metadata type using the corresponding confidence scores 142. For instance, the metadata processing system 104 can determine whether a confidence score for a first engine satisfies a confidence threshold. The metadata processing system 104 can perform a similar operation for the other engines used to determine predicted values for the metadata type.

The metadata processing system 104 can select a value for which the corresponding confidence score satisfies the confidence threshold, e.g., is greater than or equal to the confidence threshold. When the metadata processing system 104 determines that multiple confidence scores satisfy the confidence threshold, the metadata processing system 104 can use a ranking for the various metadata extraction process engines 128, a frequency of the values, or a combination of both, e.g., weighted frequencies, to determine the value for the metadata type.

When the metadata processing system 104 determines that none of the confidence scores for the metadata type satisfy the confidence threshold, the metadata processing system 104 can determine a default value for the metadata type. For instance, the metadata processing system 104 can determine the default value from the ontology for the document 103, from a database of default values, or a combination of both.

In some examples, one or more of the metadata extraction process engines 128 can have different confidence thresholds. For instance, an artificial intelligence model 130 can have a higher confidence threshold than a rule extraction engine 136 or a key phrase extraction engine 132.

In some examples, one or more of the metadata extraction process engines 128 might not have a confidence threshold, e.g., or confidence scores. For instance, the metadata processing system 104 might determine confidence scores for an artificial intelligence model 130 and a key phrase extraction engine 132 without determining a confidence score for a rule extraction engine 136 for the same metadata type. In this example, the metadata processing system 104 might not select a region extraction engine 134 for the corresponding metadata type, e.g., document type.

In some implementations, the metadata processing system 104 can use prioritization data to determine a value to select. For instance, the ontology can indicate, for a document type, metadata type, entity, or combination of these, a prioritization of the metadata extraction process engines 128. When the priority indicates that the artificial intelligence model 130 has the highest priority, the metadata processing system 104 can determine whether a confidence score for a value determined by the artificial intelligence model 130 satisfies a confidence threshold. If so, the metadata processing system 104 determines to use the value for a corresponding metadata type. If not, the metadata processing system 104 can determine another engine to analyze from the metadata extraction process engines 128. The metadata processing system 104 can use a similar process for any other engine that has the highest priority, e.g., 132, 134, or 136.

In some examples, multiple engines can have the same priority. In these examples, the metadata processing system 104 can perform combinations of one or more processes described above along with the prioritization process.

In some implementations, the metadata processing system 104 can use a weight for a key phrase. The weight for a key phrase can indicate a likelihood that the metadata processing system 104, e.g., the key phrase extraction engine 132, should use data for a corresponding key phrase to determine a value for a corresponding metadata type. For instance, when the key phrase extraction engine 132 has two key phrases either of which could be used for a value for a metadata type, the key phrase extraction engine 132 can determine a frequency of each of the key phrases. The key phrase extraction engine 132 can combine the respective frequencies with respective weights, e.g., multiply the two respective values, to determine a score for the key phrase. In these instances, the key phrase extraction engine 132 can select, as the value for the metadata type, the key phrase with a score that satisfies a criterion, e.g., has the highest or lowest score.

The metadata processing system 104 can provide the metadata 145 to the natural language processing system 144. The natural language processing system 144 can use the metadata 145 for the document 103 to determine whether to perform natural language processing on the document 103, as input to the natural language process on the document 103, or a combination of both.

For instance, the natural language processing system 144 can use the metadata 145 to determine whether the metadata includes values for one or more metadata types. The natural language processing system 144 can determine the one or more metadata types using a type of the document 103, a label for the document 103, e.g., defined in the metadata or otherwise, other appropriate data, or a combination of two or more of these.

When the natural language processing system 144 determines that the metadata 145 does not include values for the one or more metadata types, the natural language processing system 144 can determine to skip natural language processing of the document 103. This can occur when the document 103 has an invalid type for the natural language processing system 144, e.g., a type for which the natural language processing system 144 is not trained, the document 103 image has a quality that does not satisfy a quality threshold, e.g., the scanned image of the original hard copy document is blurry, or a combination of both.

When the natural language processing system 144 determines that the metadata includes values for the one or more metadata types, the natural language processing system 144 can determine to perform natural language processing of the document 103. The natural language processing system 144 can use at least some of the metadata 145 as input for the natural language processing. For instance, the natural language processing system 144 can rule out certain NLP results given the metadata 145, e.g., that a particular phase is not likely to occur in a document with a particular value for a corresponding metadata type. This can improve an accuracy of phrases detected in the document 103 during the natural language processing.

The natural language processing system 144 can generate NLP data 146 as a result of the natural language processing of the document 103. The natural language processing system 144 can provide the NLP data 146 to one or more downstream systems 106. The downstream systems 106 can perform additional analysis or otherwise use the NLP data 146. The downstream systems 106 can operate more accurately using the NLP data 146 that was generated using at least some of the metadata since the metadata improves the natural language processing of the document 103. For instance, the downstream systems 106 can operate more accurately given the higher accuracy of the NLP data 146, e.g., compared to other systems.

The document 103 can have any appropriate amount of metadata when received by the metadata processing system 104. For instance, the document 103 might not have any corresponding metadata. In some examples, the document 103 might have some metadata and might be missing values for other metadata types, have values that might be inaccurate, or a combination of both. When the document 103 has corresponding metadata, the metadata processing system 104 can receive the metadata with the document 103, e.g., in the same group or groups of packets, separately from the document 103, e.g., in packets received from another database, or some combination of both.

The metadata processing system 104, the preprocessing system 108, and the natural language processing system 144 are each examples of a system implemented as computer programs on one or more computers in one or more locations, in which the systems, components, and techniques described in this specification are implemented. The downstream systems 106 can include one or more computers. The network (not shown), such as a local area network ("LAN"), wide area network ("WAN"), the Internet, or a combination thereof, connects the document database 102, the metadata processing system 104, the preprocessing system 108, the natural language processing system 144, and the downstream systems 106. The metadata processing system 104, the preprocessing system 108, and the natural language processing system 144 can use a single server computer or multiple server computers operating in conjunction with one another, including, for example, a set of remote computers deployed as a cloud computing service.

The metadata processing system 104 and the preprocessing system 108 can include several different functional components, including the ontology extraction engine 110, the normalization engine 112, the segmentation engine 114, the tokenization engine 116, the feature extraction engine 118, and the engines included in the metadata extraction process engines 128. The ontology extraction engine 110, the normalization engine 112, the segmentation engine 114, the tokenization engine 116, the feature extraction engine 118, the engines included in the metadata extraction process engines 128, or a combination of these, can include one or more data processing apparatuses, can be implemented in code, or a combination of both. For instance, each of the ontology extraction engine 110, the normalization engine 112, the segmentation engine 114, the tokenization engine 116, the feature extraction engine 118, and the engines included in the metadata extraction process engines 128 can include one or more data processors and instructions that cause the one or more data processors to perform the operations discussed herein.

The various functional components of the systems in the environment 100 can be installed on one or more computers as separate functional components or as different modules of a same functional component. For example, the ontology extraction engine 110, the normalization engine 112, the segmentation engine 114, the tokenization engine 116, the feature extraction engine 118, and the engines included in the metadata extraction process engines 128 of the metadata processing system 104 can be implemented as computer programs installed on one or more computers in one or more locations that are coupled to each through a network. In cloud-based systems for example, these components can be implemented by individual computing nodes of a distributed computing system.

FIG. 2 is a flow diagram of an example process 200 for processing metadata. For example, the process 200 can be used by the metadata processing system 104 from the environment 100.

A metadata processing system accesses a document a) that has, in metadata that can be used to perform metadata processing for the document, a first set of values for a first subset of metadata types from a plurality of metadata types for the metadata and b) for which a second set of values for a second subset of metadata types from the plurality of metadata types can be augmented (202). In some examples, the document might not include any metadata, e.g., the first subset might be an empty subset.

If the second subset is an empty subset, the process 200 would stop. As a result, for the process 200 to continue, the second subset is not an empty subset and there is at least one metadata type from the plurality of metadata types that can be augmented.

The metadata processing system can access the document in any appropriate manner. For instance, the metadata processing system can receive the document from a database included in the metadata processing system, a natural language processing system, a preprocessing engine, or another external system.

The document can be stored at the same location or a different location from what which stores the metadata. For example, a single database can maintain both the document and the document's metadata. In some examples, a first database maintains the document and a second, different database maintains the document's metadata.

In some implementations, a natural language processing system can determine whether metadata for the document should be supplemented, if possible. In these implementations, the natural language processing system can access the document and determine whether to send data for the document to the metadata processing system. If the natural language processing system determines that at least some metadata types do not have values, have values that do not satisfy an accuracy threshold, or a combination of both, the natural language processing system can provide data for the document to the metadata processing system. If the natural language processing system determines that all metadata types have corresponding values, that all metadata values satisfy an accuracy threshold, or both, the natural language processing system can determine to skip supplementing metadata for the document, e.g., to skip sending data for the document to the metadata processing system.

The metadata processing system determines whether there is a value for a metadata type included in the metadata, a predicted accuracy of the value satisfies a threshold accuracy, or both (204). This determination is one example of a determination whether a value for a metadata type can be augmented.

For instance, the metadata processing system can determine a type of the document. The metadata processing system can make this determination using the metadata, a message for the document, e.g., in which the document was included, analysis of an image included in the document, e.g., of a corresponding hard copy document, another process, or a combination of these. The metadata processing system can determine one or more metadata types for the document using the type of the document. The metadata processing system can determine whether the metadata processing system has values for each of the one or more metadata types.

The metadata processing system can use any appropriate process to predict an accuracy of a metadata value. For instance, the metadata processing system can determine whether a value for a metadata type is one of a set of historical values for the metadata type, satisfies a rule for what values are allowed for the metadata type, or a combination of these.

The accuracy threshold can be satisfied when the predicted accuracy is greater than, equal to, or either, the accuracy threshold. In some examples, when an accuracy value is inverted, the accuracy threshold can be satisfied when the predicted accuracy is less than, equal to, or either, the accuracy threshold.

The metadata processing system determines to normalize the value or skip selection for the document of a value extraction process for the metadata type (206). For instance, when the metadata processing system determines that a metadata type, e.g., for the document type, includes a corresponding value and that the predicted accuracy of the value satisfies the accuracy threshold, the metadata processing can determine to skip determination of a value for the metadata type using a value extraction process. The metadata processing system can repeat this process for all metadata types. If the metadata processing system determines a "yes" result for each metadata type, the metadata processing system can determine to skip analysis of the document for metadata type values.

In some implementations, the metadata processing system can normalize the value for the metadata type when the metadata type, e.g., for the document type, includes the corresponding value and the predicted accuracy of the value satisfies the accuracy threshold. For instance, the metadata processing system can normalize the value using one or more of the processes described in this specification.

The metadata processing system selects, for the metadata type, one or more value extraction processes from a plurality of value extraction processes each of which is for a corresponding metadata type from the plurality of metadata types (208). For instance, when the metadata processing system determines that a value can be augmented, the metadata processing system can select the one or more value extraction processes.

Selection of the one or more value extraction processes, e.g., from a plurality of value extraction processes, can include selection of a metadata extraction process engine. For instance, the metadata processing system can determine whether to select an artificial intelligence model, e.g., a machine learning model, a key phrase extraction engine, a region extraction engine, a rule extraction engine, or a combination of these. The metadata processing system can select an artificial intelligence model from a plurality of artificial intelligence models each of which was trained to detect values for a corresponding metadata type from the plurality of metadata types. The metadata processing system can then use the selected artificial intelligence model for the metadata type to determine a corresponding value.

In some examples, as part of the artificial intelligence model use, the metadata processing system can provide structured data for the document to the selected artificial intelligence model as input. The structured data can include any appropriate type of data. For instance, the document, prior to analysis by the metadata processing system, can include unstructured data, e.g., an image of a document on which object-character recognition has been performed. The metadata processing system can provide, as the input, one or more n-grams features; one or more section header features; one or more cross features; one or more gazetteer features; or a combination of two or more of these.

The metadata processing system determines, using the one or more value extraction processes and the document, a value for the metadata type (210). For instance, the metadata processing system determines the value using one or more operations as described in more detail about. This can include using one or more rules for the metadata type that are different than one or more second rules for determining another metadata value for another metadata type from the second subset of metadata types for which a value can be augmented.

In some examples, the metadata processing engine can use region analysis. The region can be any appropriate type of region, such as a section or a field in the document. For instance, the metadata processing system can determine, for one or more fields in the document, whether the one or more fields have data. The metadata processing system can determine, using a result of the determination whether the one or more fields have data, the value for the metadata type. The metadata processing system can determine, from multiple fields in the document, the one or more fields to analyze using the metadata type.

The metadata processing system can access documents for different entities, that have different document types, or a combination of both. In these examples, the different documents might have different phrases that refer to the same thing, e.g., an acronym and the phrase itself. To improve an accuracy of a metadata process, the metadata processing system can use a single ontology for both documents to normalize one or more phrases in the corresponding document. As a result, the metadata processing system can determine, as the value for the metadata type, a normalized phrase for the document.

The metadata processing system stores the value for the metadata type as part of the metadata for the document (212). For instance, the metadata processing system can access a memory, e.g., a database, and update the metadata for the document to include the value. For instance, when the metadata processing system accesses the metadata from the memory, e.g., when the metadata includes one or more initial values, the metadata processing system can update the data for the metadata with the value.

In some implementations, when the document does not have any initial metadata, the metadata processing system can access the metadata by accessing a template that indicates the metadata types for the document, e.g., for the document type. In these implementations, the metadata processing system can store metadata for the document in memory, which stored metadata includes the value for the metadata type.

The natural language processing system determines whether natural language processing should be performed on the document (214). The natural language processing system can use any appropriate process to determine whether to perform natural language processing. The natural language processing system can use the metadata as input for this determination.

The natural language processing system performs natural language processing on the document using the metadata (216). For instance, in response to determining to perform natural language processing, the natural language processing system can provide the metadata as input to a natural language processing engine, e.g., along with unstructured data for the document.

The natural language processing system determines to skip performing natural language processing on the document (218).

The order of steps in the process 200 described above is illustrative only, and the metadata processing can be performed in different orders. For example, the process 200 can include determining whether to perform natural language processing on a document before performing operation 204, operation 208, or another appropriate operation. In these examples, the natural language processing system might have other data to determine whether to perform natural language processing and can perform that determination before analyzing metadata for the document.

In some implementations, the process 200 can include additional steps, fewer steps, or some of the steps can be divided into multiple steps. For example, the process 200 can include operations 202, 208, 210, and 212 without the other operations in the process 200. In some examples, the process 200 can include operations 202, 210, and 212, without the other operations in the process 200. In some examples, the process 200 can include operations 202, 204, optionally 208, 210, and 212 without the other operations in the process 200. These variations and other variations can include operations 214, 216, or both.

In this specification, the term "database" is used broadly to refer to any collection of data: the data does not need to be structured in any particular way, or structured at all, and it can be stored on storage devices in one or more locations. A database can be implemented on any appropriate type of memory.

An electronic document, which for brevity will simply be referred to as a document, may, but need not, correspond to a file. A document may be stored in a portion of a file that holds other documents, in a single file dedicated to the document in question, or in multiple coordinated files. The document can be an electronic version of a hardcopy document, e.g., a paper document. The document might have been processed using one or more prior processes, e.g., object character recognition.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

A number of implementations have been described. Nevertheless, it will be understood that various modifications can be made without departing from the spirit and scope of the disclosure. For example, various forms of the flows shown above can be used, with operations re-ordered, added, or removed.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, a data processing apparatus. Alternatively or in addition, the program instructions can be encoded on an artificially-generated propagated signal, e.g., a machine-generated electrical, optical, or electromagnetic signal, that is generated to encode information for transmission to a suitable receiver apparatus for execution by a data processing apparatus. One or more computer storage media can include a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can be or include special purpose logic circuitry, e.g., a field programmable gate array ("FPGA") or an application-specific integrated circuit ("ASIC"). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can be performed by, and apparatus can also be implemented as, special purpose logic circuitry, e.g., a field programmable gate array ("FPGA") or an application-specific integrated circuit ("ASIC").

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. A computer can be embedded in another device, e.g., a mobile telephone, a smart phone, a headset, a personal digital assistant ("PDA"), a mobile audio or video player, a game console, a Global Positioning System ("GPS") receiver, or a portable storage device, e.g., a universal serial bus ("USB") flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a liquid crystal display ("LCD"), an organic light emitting diode ("OLED") or other monitor, for displaying information to the user and a keyboard and a pointing device, e.g., a mouse or a trackball or a touchscreen, by which the user can provide input to the computer. Other kinds of devices can be used to provide for interaction with a user as well. For example, feedback provided to the user can be any form of sensory feedback, e.g., visual feedback, auditory feedback, or tactile feedback; and input from the user can be received in any form, including acoustic, speech, or tactile input. In some examples, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an Hypertext Markup Language ("HTML") page, to a user device, e.g., for purposes of displaying data to and receiving user input from a user device, which acts as a client. Data generated at the user device, e.g., a result of user interaction with the user device, can be received from the user device at the server.

Figure 3:
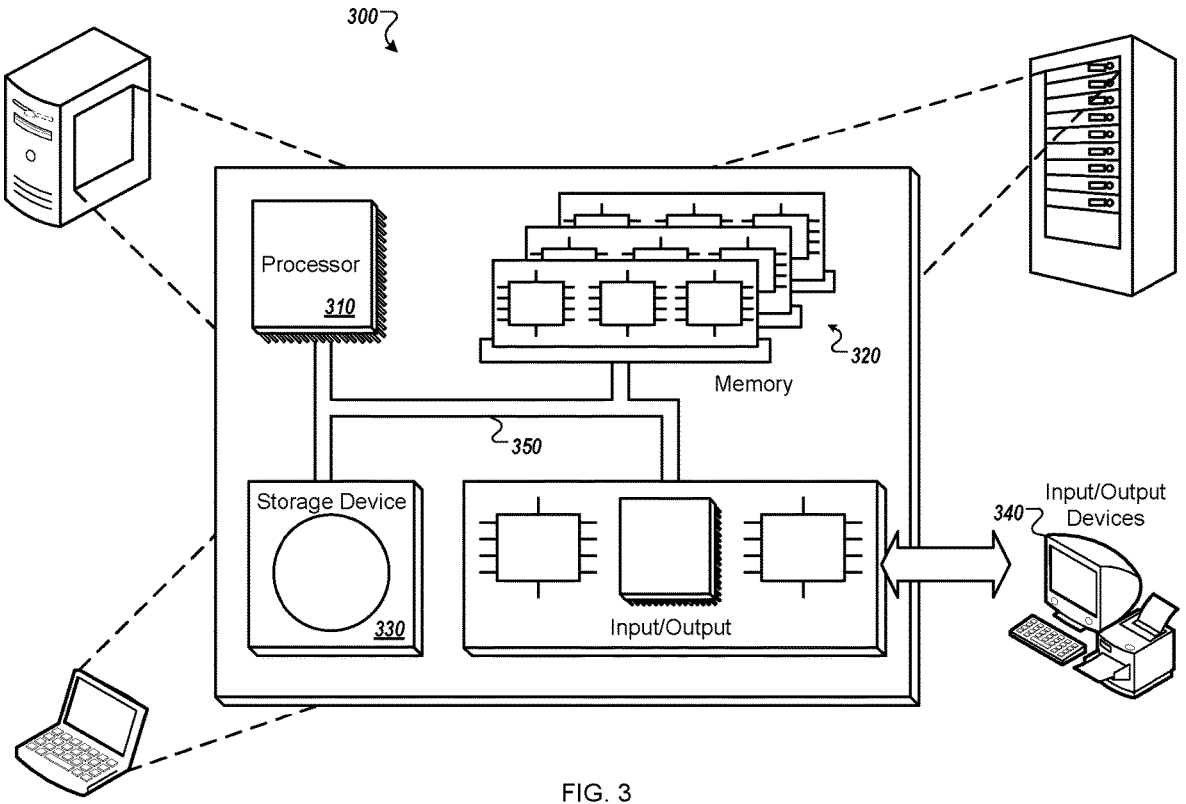
FIG. 3 is a block diagram of a computing system that can be used in connection with computer-implemented methods described in this specification.

An example of one such type of computer is shown in FIG. 3, which shows a schematic diagram of a computer system 300. The computer system 300 can be used for the operations described in association with any of the computer-implemented methods described previously, according to some implementations. The computer system 300 includes a processor 310, a memory 320, a storage device 330, and an input/output device 340. Each of the components 310, 320, 330, and 340 are interconnected using a system bus 350. The processor 310 is capable of processing instructions for execution within the computer system 300. In one implementation, the processor 310 is a single-threaded processor. In another implementation, the processor 310 is a multi-threaded processor. The processor 310 is capable of processing instructions stored in the memory 320 or on the storage device 330 to display graphical information for a user interface on the input/output device 340.

The memory 320 stores information within the computer system 300. In some implementations, the memory 320 is a computer-readable medium. In some implementations, the memory 320 is a volatile memory unit. In some implementations, the memory 320 is a non-volatile memory unit.

The storage device 330 is capable of providing mass storage for the computer system 300. In some implementations, the storage device 330 is a computer-readable medium. In some implementations, the storage device 330 can be a floppy disk device, a hard disk device, an optical disk device, or a tape device.

The input/output device 340 provides input/output operations for the computer system 300. In some implementations, the input/output device 340 includes a keyboard, a pointing device, a touchscreen, or a combination of these. In some implementations, the input/output device 340 includes a display unit for displaying graphical user interfaces. In some implementations, the input/output device 340 includes a microphone, a speaker, or a combination of both.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures, such as spreadsheets, relational databases, or structured files, may be used.

Particular implementations of the invention have been described. Other implementations are within the scope of the following claims. For example, the operations recited in the claims, described in the specification, or depicted in the figures can be performed in a different order and still achieve desirable results. In some cases, multitasking and parallel processing may be advantageous.

What is claimed is:

1. A computer-implemented method comprising:

accessing, from memory, a document a) that has, in metadata that can be used to perform natural language processing for the document, a first set of values for a first subset of metadata types from a plurality of metadata types for the metadata and b) for which a second set of values for a second subset of metadata types from the plurality of metadata types can be augmented;

determining, for a metadata type from the plurality of metadata types and before selecting one or more value extraction processes, that a value for a corresponding metadata type is not included in the metadata or a predicted accuracy of the value for the corresponding metadata type does not satisfy a threshold accuracy;

selecting, for a metadata type from the second subset of metadata types for which a value can be augmented, one or more value extraction processes from a plurality of value extraction processes each of which is for a corresponding metadata type from the plurality of metadata types, wherein selecting the one or more value extraction processes is responsive to determining that the value for the corresponding metadata type is not included in the metadata or the predicted accuracy of the value for the corresponding metadata type does not satisfy the threshold accuracy;

determining, using the one or more value extraction processes and the document, a value for the metadata type;

determining, for another metadata type from the plurality of metadata types, that another predicted accuracy for another value for the other metadata type satisfies the threshold accuracy;

in response to determining that the other predicted accuracy for the other value for the other metadata type satisfies the threshold accuracy, determining to normalize the other value; and storing, in memory, the value for the metadata type as part of the metadata for the document.

2. The method of claim 1, comprising:

determining, for the metadata type from the plurality of metadata types and before selecting the one or more value extraction processes, that a value for the corresponding metadata type is not included in the metadata or a predicted accuracy of the value for the corresponding metadata type does not satisfy a threshold accuracy, wherein selecting the one or more value extraction processes is responsive to determining that the value for the corresponding metadata type is not included in the metadata or the predicted accuracy of the value for the corresponding metadata type does not satisfy the threshold accuracy;

determining, for another metadata type from the plurality of metadata types, whether another predicted accuracy for another value for the other metadata type satisfies the threshold accuracy; and in response to determining that the other predicted accuracy for the other value for the other metadata type satisfies the threshold accuracy, determining to normalize the other value.

3. The method of claim 1, comprising providing, to a natural language processing system, the second subset of metadata to cause the natural language processing system to perform natural language processing on the document using the second subset of metadata.

4. The method of claim 3, wherein providing the second subset of metadata to the natural language processing system causes the natural language processing system to determine, using the second subset of metadata, whether to perform natural language processing on the document.

5. The method of claim 1, comprising providing, to a natural language processing system, the second set of metadata to cause the natural language processing system to determine, using the second subset of metadata, to skip performing natural language processing on the document.

6. The method of claim 1, comprising, for each of two or more documents each of which is for a different entity and has a different document type and using a single ontology:

normalizing one or more phrases in the corresponding document, wherein:

determining, using the one or more value extraction processes and the document, the value for the metadata type uses the normalized one or more phrases from the corresponding document.

7. The method of claim 1, wherein:

selecting the one or more value extraction processes comprises selecting, for the metadata type from the second subset of metadata types for which a value can be augmented, an artificial intelligence model from a plurality of artificial intelligence models each of which was trained to detect values for a corresponding metadata type from the plurality of metadata types; and determining, using the one or more value extraction processes, the value for the metadata type uses the selected artificial intelligence model for the metadata type.

8. The method of claim 7, wherein determining, using the selected artificial intelligence model for the metadata type, the value for the metadata type comprises providing structured data for the document to the selected artificial intelligence model as input.

9. The method of claim 1, wherein determining, using the one or more value extraction processes, the value for the metadata type comprises:

detecting, for the first metadata type, two or more key phrases in the document;

determining, for each of the two or more key phrases, a frequency of the respective key phrase in the document; and selecting, as the value for the metadata type, a most frequent key phrase from the two or more key phrases and that has a highest frequency in the document of the two or more key phrase.

10. The method of claim 9, wherein detecting the two or more key phrases in the document comprises:

determining, for the metadata type, one or more regions in the document to analyze for key phrases; and detecting, in the one or more regions in the document, the two or more key phrases.

11. The method of claim 10, wherein the one or more regions in the document to analyze for the key phrase for the metadata type are different than one or more second regions in the document to detect a second key phrase for another metadata type from the second subset of for which a value can be augmented.

12. The method of claim 1, wherein determining the value for the metadata type from the second subset of metadata types for which a value can be augmented uses, as the one or more value extraction processes, the key phrase and one or more rules for the metadata type.

13. The method of claim 12, wherein the one or more rules for the metadata type are different than one or more second rules for determining another metadata value for another metadata type from the second subset of metadata types for which a value can be augmented.

14. The method of claim 1, wherein determining, using the one or more value extraction processes, the value for the metadata type comprises:

determining, using the one or more value extraction processes, that a confidence score for a detected value that indicates a likelihood that the detected value is for the metadata type does not satisfy a confidence threshold; and selecting, using the metadata type and an ontology, a default value for the metadata type in response to determining that the confidence score for the detected value that indicates the likelihood that the detected value is for the metadata type does not satisfy the confidence threshold.

15. The method of claim 1, wherein determining, using the one or more value extraction processes, the value for the metadata type comprises:

determining, for one or more fields in the document, whether the one or more fields have data; and determining, using a result of the determination whether the one or more fields have data, the value for the metadata type.

16. The method of claim 15, comprising determining, from a plurality of fields in the document each of which are for at least one metadata type from the plurality of metadata types, the one or more fields in the document using the metadata type.

17. One or more non-transitory computer storage media encoded with instructions that, when executed by one or more computers, cause the one or more computers to perform operations comprising:

accessing, from memory, a document a) that has, in metadata that can be used to perform natural language processing for the document, a first set of values for a first subset of metadata types from a plurality of metadata types for the metadata and b) for which a second set of values for a second subset of metadata types from the plurality of metadata types can be augmented;

determining, for the metadata type from the plurality of metadata types and before selecting the one or more value extraction processes, that a value for the corresponding metadata type is not included in the metadata or a predicted accuracy of the value for the corresponding metadata type does not satisfy a threshold accuracy;

selecting, for a metadata type from the second subset of metadata types for which a value can be augmented, one or more value extraction processes from a plurality of value extraction processes each of which is for a corresponding metadata type from the plurality of metadata types, wherein selecting the one or more value extraction processes is responsive to determining that the value for the corresponding metadata type is not included in the metadata or the predicted accuracy of the value for the corresponding metadata type does not satisfy the threshold accuracy;

determining, using the one or more value extraction processes and the document, a value for the metadata type;

determining, for another metadata type from the plurality of metadata types, that another predicted accuracy for another value for the other metadata type satisfies the threshold accuracy;

in response to determining that the other predicted accuracy for the other value for the other metadata type satisfies the threshold accuracy, determining to normalize the other value; and storing, in memory, the value for the metadata type as part of the metadata for the document.

18. The computer storage media of claim 17, the operations comprising providing, to a natural language processing system, the second subset of metadata to cause the natural language processing system to perform natural language processing on the document using the second subset of metadata.

19. A system comprising one or more computers and one or more storage devices on which are stored instructions that are operable, when executed by the one or more computers, to cause the one or more computers to perform operations comprising:

accessing, from memory, a document a) that has, in metadata that can be used to perform natural language processing for the document, a first set of values for a first subset of metadata types from a plurality of metadata types for the metadata and b) for which a second set of values for a second subset of metadata types from the plurality of metadata types can be augmented;

determining, for a metadata type from the plurality of metadata types and before selecting one or more value extraction processes, that a value for a corresponding metadata type is not included in the metadata or a predicted accuracy of the value for the corresponding metadata type does not satisfy a threshold accuracy;

selecting, for a metadata type from the second subset of metadata types for which a value can be augmented, one or more value extraction processes from a plurality of value extraction processes each of which is for a corresponding metadata type from the plurality of metadata types, wherein selecting the one or more value extraction processes is responsive to determining that the value for the corresponding metadata type is not included in the metadata or the predicted accuracy of the value for the corresponding metadata type does not satisfy the threshold accuracy;

determining, using the one or more value extraction processes and the document, a value for the metadata type;

determining, for another metadata type from the plurality of metadata types, that another predicted accuracy for another value for the other metadata type satisfies the threshold accuracy;

in response to determining that the other predicted accuracy for the other value for the other metadata type satisfies the threshold accuracy, determining to normalize the other value; and storing, in memory, the value for the metadata type as part of the metadata for the document.

* * * * *